(12) United States Patent
Zhang

(10) Patent No.: US 12,734,421 B2
(45) Date of Patent: Sep. 15, 2026

(54) GOLF BAG TROLLEY WITH EXTENDABLE FRAME

(71) Applicant: NINGBO WENTAI SPORT EQUIPMENT CO., LTD., Zhejiang (CN)

(72) Inventor: Sheng Zhang, Zhejiang (CN)

(73) Assignee: NINGBO WENTAI SPORT EQUIPMENT CO., LTD., Zhejiang (CN)

( * ) Notice: Subject to any disclaimer, the term of this patent is extended or adjusted under 35 U.S.C. 154(b) by 235 days.

(21) Appl. No.: 18/728,462

(22) PCT Filed: Jun. 16, 2023

(86) PCT No.: PCT/CN2023/100661

§ 371 (c)(1),
(2) Date: Jul. 12, 2024

(87) PCT Pub. No.: WO2024/113766

PCT Pub. Date: Jun. 6, 2024

(65) Prior Publication Data

US 2025/0135304 A1 May 1, 2025

(30) Foreign Application Priority Data

Nov. 28, 2022 (CN) ........................ 202223158415.0

(51) Int. Cl.
*A63B 55/60* (2015.01)
*B62B 3/02* (2006.01)

(52) U.S. Cl.
CPC ................ *A63B 55/60* (2015.10); *B62B 3/02* (2013.01); *B62B 2202/404* (2013.01)

(58) Field of Classification Search
CPC ............................ A63B 55/60; A63B 6263/02
See application file for complete search history.

(56) References Cited

U.S. PATENT DOCUMENTS 5,451,072 A * 9/1995 Weng ...................... B62B 1/047 280/DIG. 6
7,137,644 B2 * 11/2006 Kimberley ............ A63B 55/60 280/654

(Continued)

FOREIGN PATENT DOCUMENTS

CN 2393578 8/2000
CN 2393578 Y * 8/2000

(Continued)

OTHER PUBLICATIONS

"International Search Report (Form PCT/ISA/210) of PCT/CN2023/100661", mailed on Sep. 12, 2023, with English translation thereof, pp. 1-5.

(Continued)

*Primary Examiner* — Jacob B Meyer
(74) *Attorney, Agent, or Firm* — JCIPRNET

(57) ABSTRACT

A golf bag trolley with an extendable frame, comprising a front wheel set, a left rear wheel set, a right rear wheel set, a handlebar set, a frame, a connecting base, an upper bag support and a lower bag support. The front wheel set is installed at the lower bag support, the left rear wheel set is installed on the connecting base, the right rear wheel set is installed on the connecting base, the frame comprises an upper tube and a lower tube, the upper tube has a smaller outer diameter than the lower tube, the upper tube is inserted into the lower tube, the lower bag support is installed at the lower tube, the handlebar set is installed at the upper tube, the upper bag support is installed on the upper tube, and a locking mechanism is arranged between the lower tube and the upper tube.

2 Claims, 7 Drawing Sheets

(56) References Cited

U.S. PATENT DOCUMENTS

| | | | | |
|---|---|---|---|---|
| 8,720,912 | B2 * | 5/2014 | Liao | A63B 55/60<br>280/47.24 |
| 8,820,776 | B2 * | 9/2014 | Wang | A63B 55/60<br>280/651 |
| 9,988,064 | B2 * | 6/2018 | Liao | B62B 7/10 |
| 12,304,545 | B2 * | 5/2025 | Zhang | B62B 5/0026 |
| 2003/0122353 | A1 * | 7/2003 | Liao | B62B 1/045<br>280/651 |
| 2004/0145136 | A1 * | 7/2004 | Yang | B62B 1/042<br>280/47.24 |
| 2025/0135304 | A1 * | 5/2025 | Zhang | A63B 55/60 |

FOREIGN PATENT DOCUMENTS

| | | | | | |
|---|---|---|---|---|---|
| CN | 101496948 | | | 8/2009 | |
| CN | 202545460 | | | 11/2012 | |
| CN | 217519017 | | | 9/2022 | |
| CN | 217519017 | U | * | 9/2022 | |
| CN | 217548938 | | | 10/2022 | |
| CN | 218923729 | | | 4/2023 | |
| EP | 4438139 | A1 | * | 10/2024 | B62B 3/02 |
| EP | 4438139 | B1 | * | 4/2026 | B62B 3/02 |
| GB | 2537114 | A | * | 10/2016 | B62B 3/12 |
| WO | WO-9936304 | A1 | * | 7/1999 | A63B 55/60 |
| WO | WO-2024113766 | A1 | * | 6/2024 | B62B 3/02 |

OTHER PUBLICATIONS

"Written Opinion of the International Searching Authority (Form PCT/ISA/237) of PCT/CN2023/100661", mailed on Sep. 12, 2023, pp. 1-4.

* cited by examiner

GOLF BAG TROLLEY WITH EXTENDABLE FRAME

CROSS-REFERENCE TO RELATED APPLICATION

This application is a 371 of international application of PCT application serial no. PCT/CN2023/100661, filed on Jun. 16, 2023, which claims the priority benefit of China application no. 202223158415.0, filed on Nov. 28, 2022. The entirety of each of the above-mentioned patent application is hereby incorporated by reference herein and made a part of this specification.

FIELD OF TECHNOLOGY

The invention relates to a golf bag trolley and, in particular, to a golf bag trolley with an extendable frame.

TECHNICAL BACKGROUND

Existing golf bag trolleys usually include a front wheel set, a left rear wheel set, a right rear wheel set, a handlebar set, a frame, a connecting base, an upper bag support and a lower bag support. The connecting base is provided with a through hole. The frame is arranged obliquely and fixed to the connecting base after passing through the through hole. The lower golf bag support is installed at a lower end of the frame. The front wheel set is installed at a front end of the lower bag support. The upper bag support is installed at an upper part of the frame. The left rear wheel set is installed on the connecting base and is located on a left side of the connecting base. The right rear wheel set is installed on the connecting base and is located on a right side of the connecting base. The handlebar set is installed at an upper end of the frame. In use, the bottom of a golf bag is supported by the lower bag support, and the upper part of the golf bag is located on the upper bag support and fixed by buckles or straps provided on the upper bag support.

However, in existing golf bag trolleys, the distance between the upper bag support and the lower bag support is fixed, so only golf bags of a corresponding height can be supported. Golf bags for people of different ages have different specifications and sizes, such as children's bags, children's bags and adult bags. Golf bags of different specifications and sizes have different heights. The existing golf bag trolleys can only be used for golf bags of which the height is greater than the distance between the upper bag support and the lower bag support. So the existing golf bag trolleys are not widely applicable.

SUMMARY OF THE INVENTION

The technical problem to be solved by the invention is to provide a golf bag trolley with an extendable frame that is widely applicable and can be used for golf bags of different heights.

Technical solutions adopted by the invention to solve the above technical problems are: A golf bag trolley with an extendable frame, comprising a front wheel set, a left rear wheel set, a right rear wheel set, a handlebar set, a frame, a connecting base, an upper bag support and a lower bag support, wherein the front wheel set is installed at a front end of the lower bag support, the left rear wheel set is installed on the connecting base and is located on a left side of the connecting base, the right rear wheel set is installed on the connecting base and is located on a right side of the connecting base, the frame comprises an upper tube and a lower tube, the upper tube has a smaller outer diameter than the lower tube, a lower part of the upper tube is inserted into the lower tube, the lower bag support is installed at a lower end of the lower tube, the handlebar set is installed at an upper end of the upper tube, the upper bag support is installed on the upper tube. and a locking mechanism is arranged between the lower tube and the upper tube; when the locking mechanism works for locking, the lower tube and the upper tube are relatively fixed; when the locking mechanism is removed, the upper tube is movable in the lower tube and can be locked again.

The locking mechanism comprises a lower tube bushing, an upper tube bushing, a pressing block, a buckle and a connecting pin, wherein the lower tube bushing is coaxially fixed to an inner side of an upper part of the lower tube. the upper tube bushing is fixedly sleeved outside the lower part of the upper tube, the lower tube bushing is located at a front side of the upper tube bushing, an outer diameter of the upper tube bushing is larger than an inner diameter of the lower tube bushing, a first mounting groove is formed in the connecting base, the upper part of the lower tube is provided with a second mounting groove facing the first mounting groove, the pressing block is embedded in the first mounting groove and the second mounting groove, the upper tube is exposed at the first mounting groove and the second mounting groove, left and right sides of the first mounting groove are respectively provided with a mounting plate fixed to the connecting base, and an upper part of the buckle is located between the two mounting plates and is provided with an eccentric hole; the connecting pin passes through the two mounting plates and the eccentric hole and then the buckle is installed on the two mounting plates; the upper part of the buckle is capable of tightly pressing the pressing block against the upper tube, and can also be separable from the pressing block and then the pressing block no longer presses the upper tube.

The lower tube is further provided with a strap or fastener structure for fixing a golf bag. In this structure, the golf bag is further fixed by means of the strap or fastener structure to enhance the reliability of the golf bag being fixed.

Compared with the prior art, the invention has the following advantages. The frame is composed of the upper tube and the lower tube. The upper tube has a smaller outer diameter than the lower tube and the lower part of the upper tube is inserted into the lower tube. The lower support is installed at the lower end of the lower tube. The handlebar set is installed at the upper end of the upper tube. The upper bag support is installed on the upper tube. The locking mechanism is arranged between the lower tube and the upper tube. When the locking mechanism works for locking. the lower tube and the upper tube are relatively fixed. When the locking mechanism is removed, the upper tube is movable in the lower tube and can be locked again. When the upper tube moves in the lower tube, the upper bag support installed on the upper tube moves synchronously, and at this moment, the distance between the upper bag support and the lower bag support is changed. In this way, the distance between the upper bag support and the lower bag support can be adjusted according to the height of golf bags of different specifications and sizes. So the golf bag trolley with an extendable frame of the invention can be widely applicable and can be used for golf bags of different heights.

DETAILED DESCRIPTION OF THE EMBODIMENTS

Figure 1:
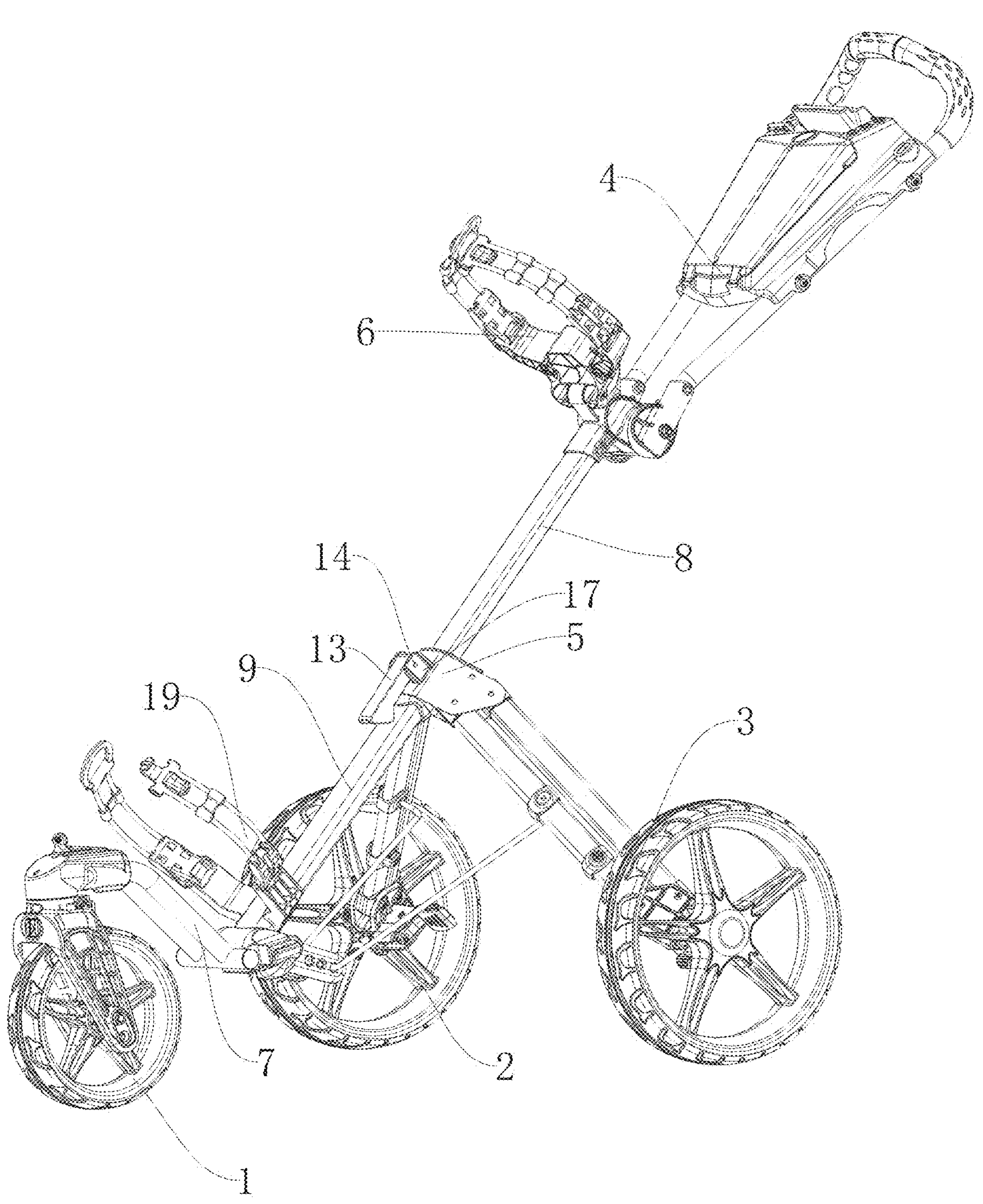
FIG. 1 is a perspective view of a golf bag trolley with an extendable frame according to the invention in an unfolded state.

With reference to the embodiments, the present invention will be further described in detail below in connection with the drawing.

Figure 2:
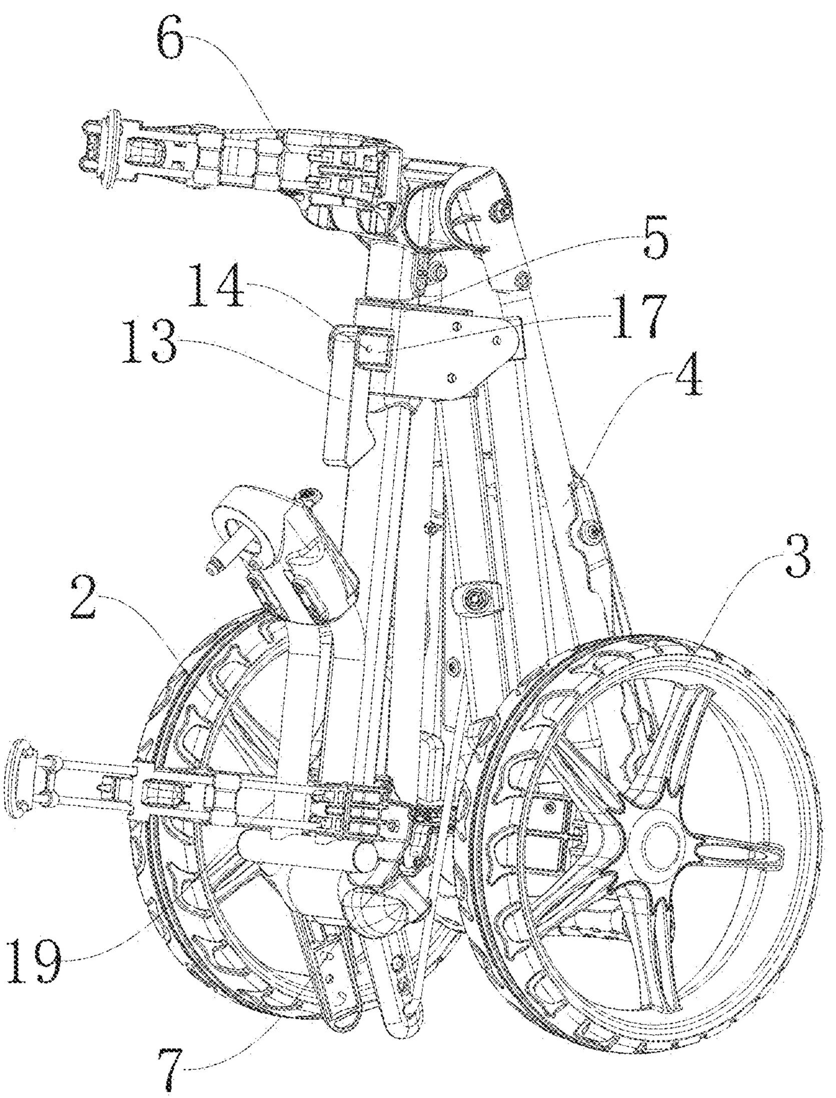
FIG. 2 is a perspective view of the golf bag trolley with an extendable frame according to the invention in a folded state.
Figure 3:
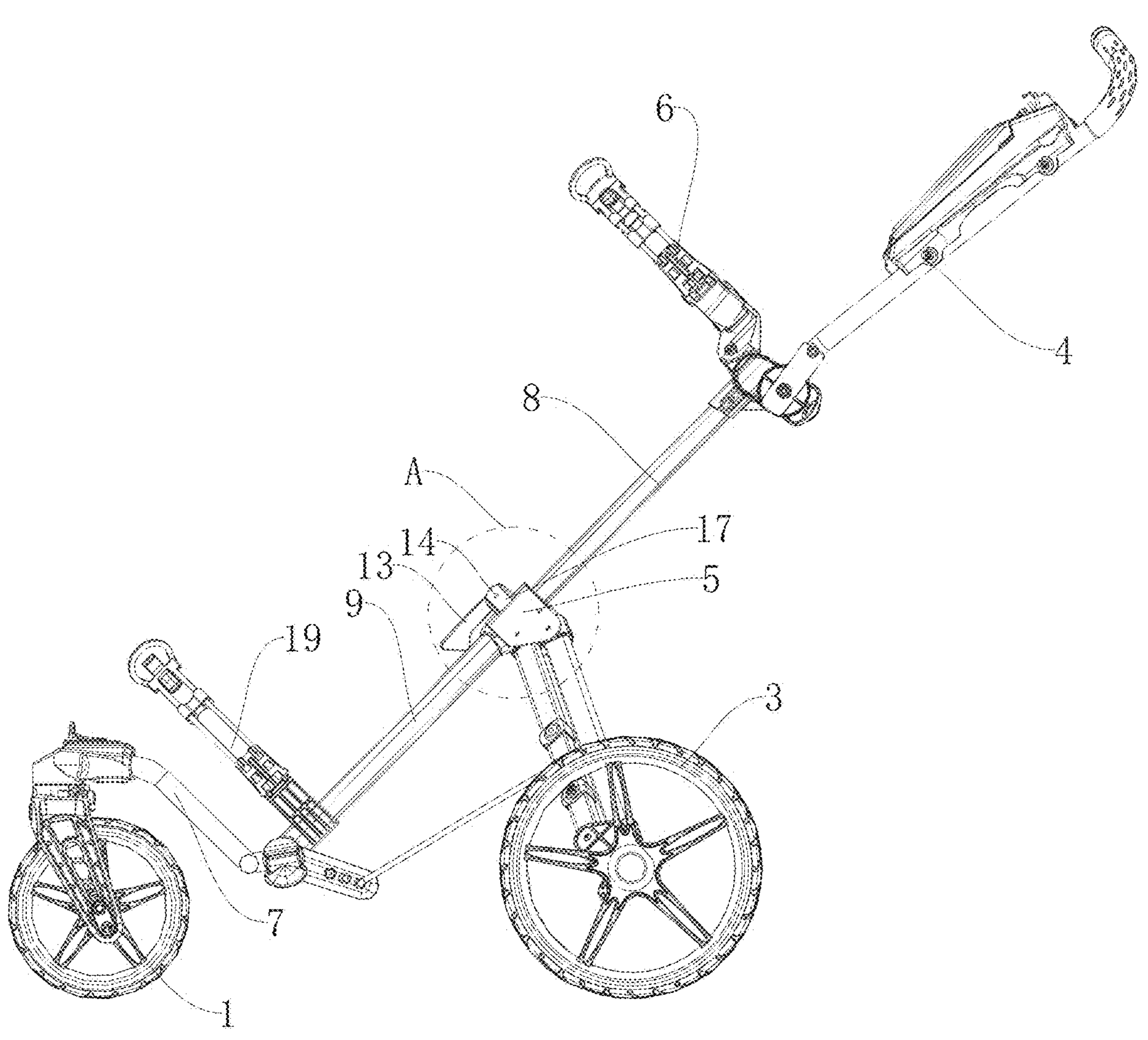
FIG. 3 is a schematic structural view of the golf bag trolley with an extendable frame according to the invention before height adjustment.
Figure 4:
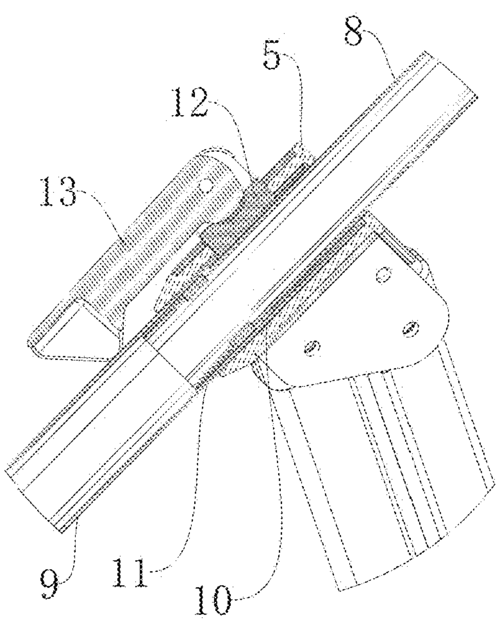
FIG. 4 is a cross-sectional view of part A in FIG. 3.
Figure 5:
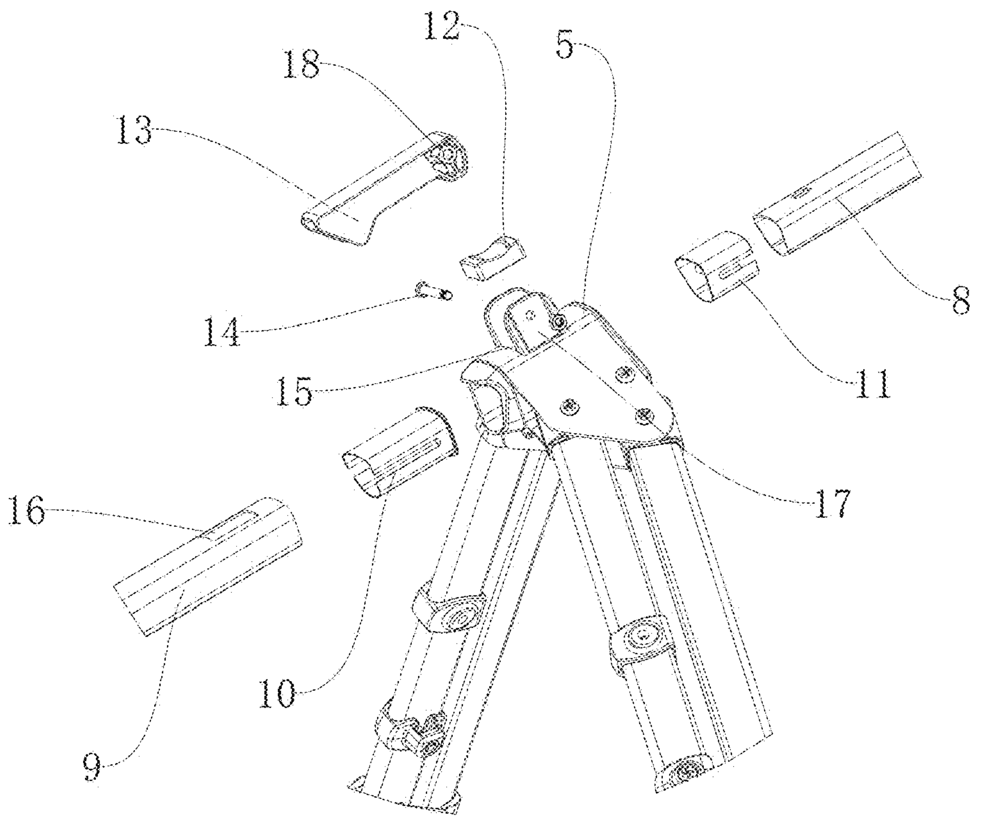
FIG. 5 is an exploded view of part A in FIG. 3.
Figure 6:
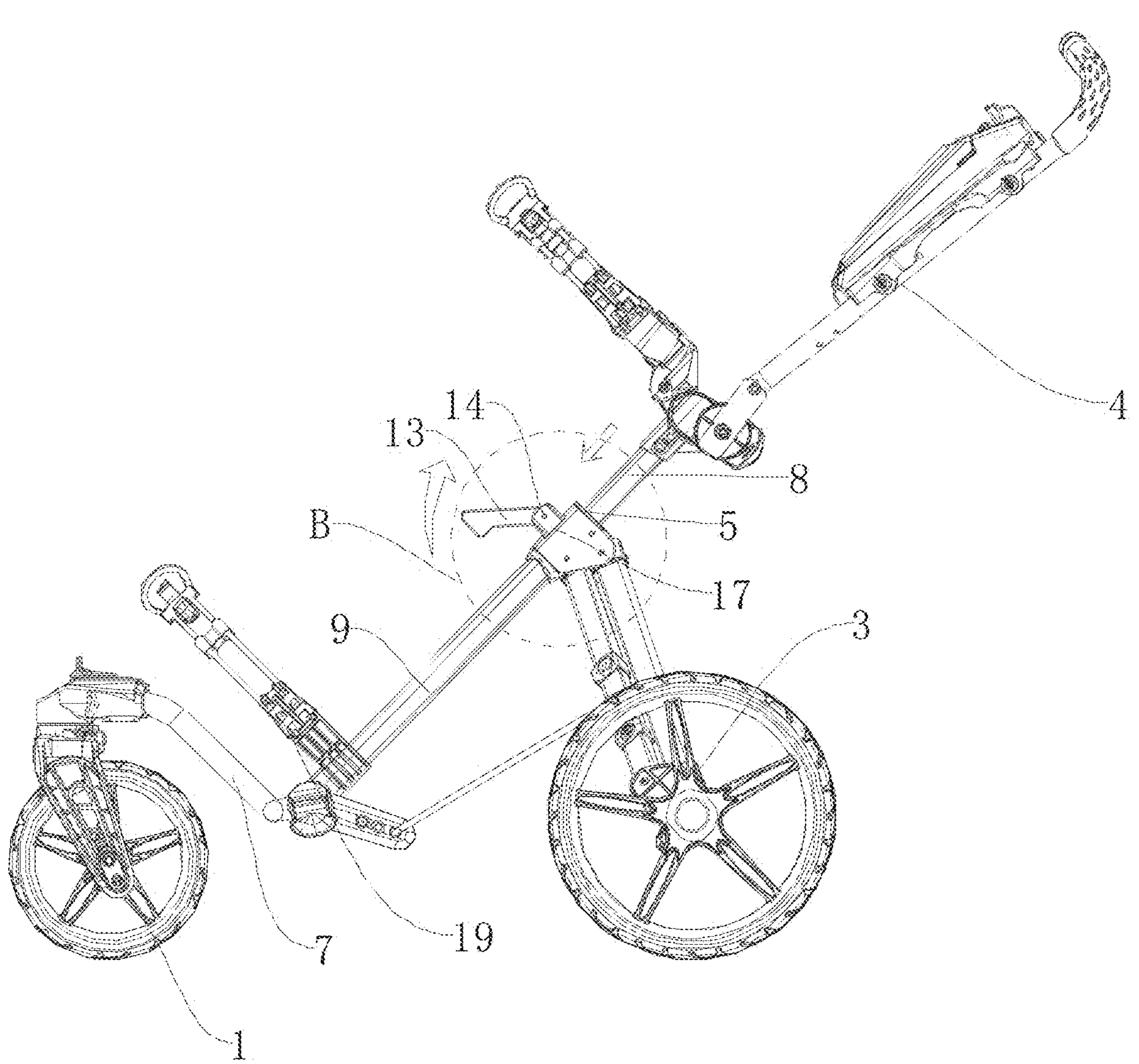
FIG. 6 is a schematic structural view of the golf bag trolley with an extendable frame according to the invention during height adjustment.
Figure 7:
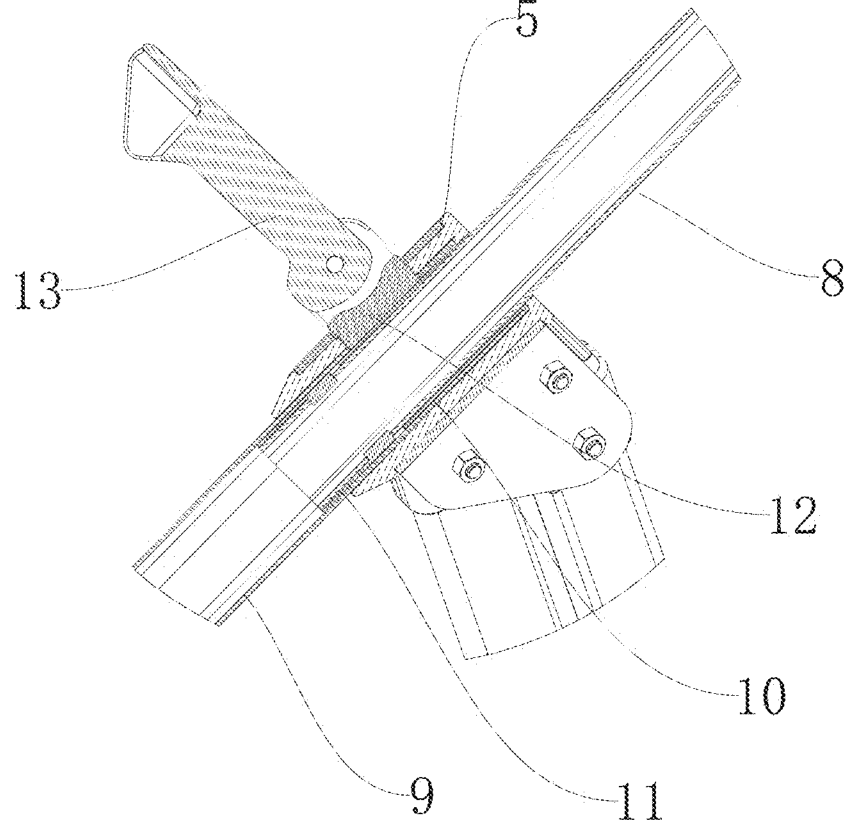
FIG. 7 is a cross-sectional view of part B in FIG. 5.
Figure 8:
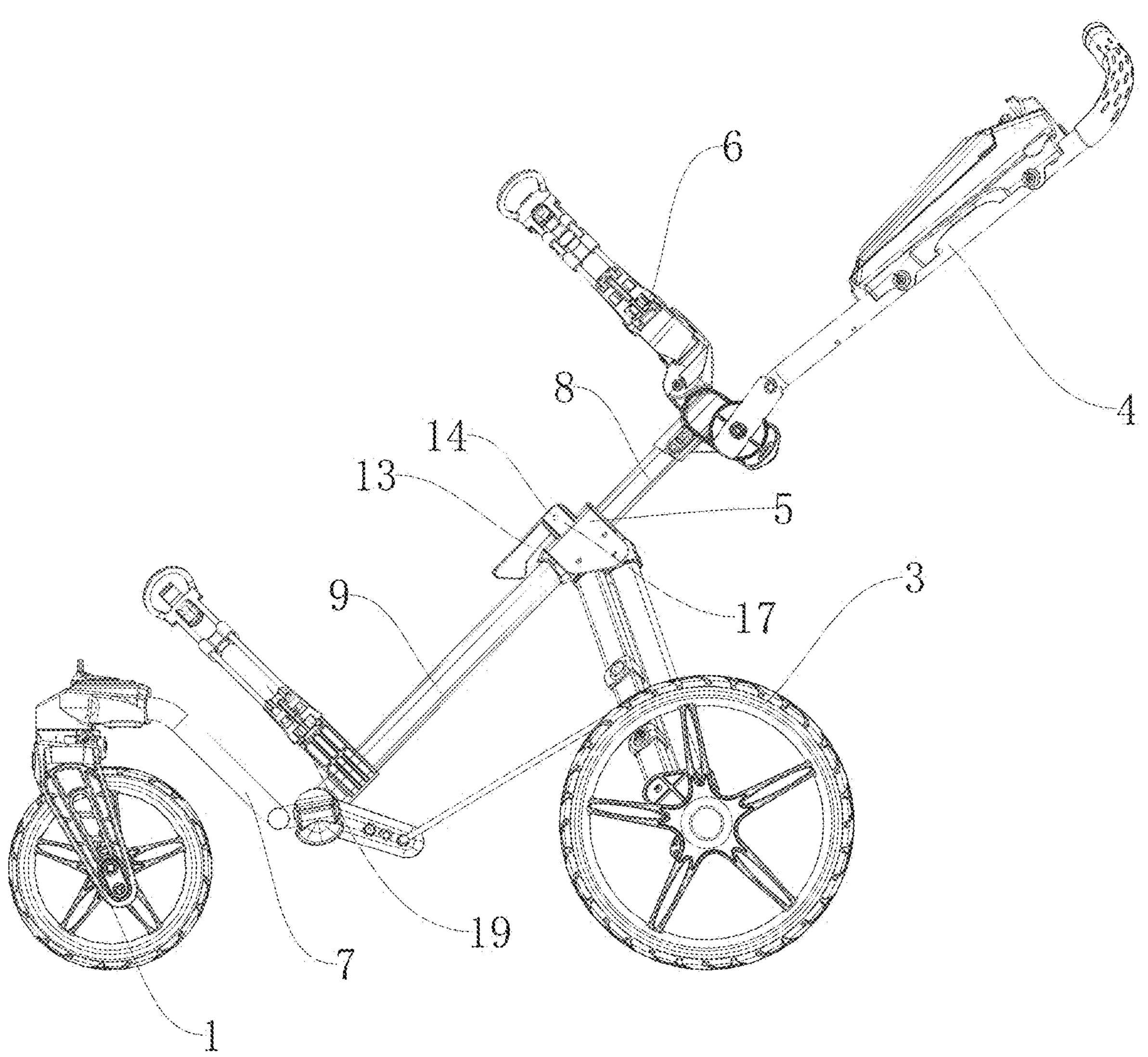
FIG. 8 is a schematic structural view of the golf bag trolley with an extendable frame according to the invention after height adjustment.

Embodiment 1: Referring to FIG. 1 to FIG. 8, illustrated is a golf bag trolley with an extendable frame, comprising a front wheel set 1, a left rear wheel set 2, a right rear wheel set 3, a handlebar set 4, a frame, a connecting base 5, an upper bag support 6 and a lower bag support 7. The front wheel set 1 is installed at a front end of the lower bag support 7. The left rear wheel set 2 is installed on the connecting base 5 and is located on a left side of the connecting base 5. The right rear wheel set 3 is installed on the connecting base 5 and is located on a right side of the connecting base 5. The frame comprises an upper tube 8 and a lower tube 9. The upper tube 8 has a smaller outer diameter than the lower tube 9, and a lower part of the upper tube 8 is inserted into the lower tube 9. The lower bag support 7 is installed at a lower end of the lower tube 9. The handlebar set 4 is installed at an upper end of the upper tube 8. The upper bag support 6 is installed on the upper tube 8. A locking mechanism is arranged between the lower tube 9 and the upper tube 8. When the locking mechanism works for locking. the lower tube 9 and the upper tube 8 are relatively fixed. When the locking mechanism is removed, the upper tube 8 is movable in the lower tube 9 and can be locked again.

In this embodiment, the locking mechanism comprises a lower tube bushing 10, an upper tube bushing 11. a pressing block 12, a buckle 13 and a connecting pin 14. The lower tube bushing 10 is coaxially fixed to an inner side of an upper part of the lower tube 9. The upper tube bushing 11 is fixedly sleeved outside the lower part of the upper tube 8. The lower tube bushing 10 is located at a front side of the upper tube bushing 11. An outer diameter of the upper tube bushing 11 is larger than an inner diameter of the lower tube bushing 10. A first mounting groove 15 is formed in the connecting base 5. The upper part of the lower tube 9 is provided with a second mounting groove 16 facing the first mounting groove 15. The pressing block 12 is embedded in the first mounting groove 15 and the second mounting groove 16. The upper tube 8 is exposed at the first mounting groove 15 and the second mounting groove 16. Left and right sides of the first mounting groove 15 are respectively provided with a mounting plate 17 fixed to the connecting base 5. An upper part of the buckle 13 is located between the two mounting plates 17 and is provided with an eccentric hole 18. The connecting pin 14 passes through the two mounting plates 17 and the eccentric hole 18, and then the buckle 13 is installed on the two mounting plates 17. The upper part of the buckle 13 is capable of tightly pressing the pressing block 12 against the upper tube 8 and is also be separable from the pressing block 12 and then the pressing block 12 no longer presses the upper tube 8.

In this embodiment, in an initial state, a lower end of the buckle 13 tightly presses the pressing block 12 against the upper tube 8 and in this case, the upper tube 8 cannot move relative to the lower tube 9, and the upper tube 8 and the lower tube 9 are locked. When the distance between the upper bag support 6 and the lower bag support 7 cannot meet the height of the current bag to be installed, the buckle 13 is pulled clockwise and then the buckle 13 rotates clockwise around the connecting pin 14. Due to the existence of the eccentric hole 18 on the buckle 13, the upper part of the buckle 13 has an eccentric structure. After being rotated, the buckle 13 is separated from the pressing block 12, the pressing block 12 no longer is pressed by the buckle 13, and the pressing block 12 no longer presses the upper tube 8. As a result, the upper tube 8 can move up and down relative to the lower tube 9. At this moment, the buckle 13 is released and the upper tube 8 is pushed upward or downward to move. When the upper tube 8 moves, the upper bag support 6 on the upper tube 8 is synchronously moved, and then the distance between the upper bag support 6 and the lower bag support 7 changes. When the distance between the upper bag support 6 and the lower bag support 7 is adjusted to meet the height of the current golf bag to be installed, the upper tube 8 is released, the buckle 13 is rotated counterclockwise to let the buckle 13 return, and then the lower end of the buckle 13 tightly presses the pressing block 12 against the upper tube 8 again. At this moment, the upper tube 8 cannot move relative to the lower tube 9, and the upper tube 8 and the lower tube 9 are locked again. In this case, the bottom of the golf bag is placed on and supported by the lower bag support 7, and then the upper part of the golf bag is placed on the upper bag support 6 and fixed by means of fasteners or straps provided on the upper bag support 6, thus completing the installation of the golf bag. The upper tube bushing 11 and the lower tube bushing 10 are configured to work together to limit the highest position of the upper tube 8. When the upper tube 8 moves upward until the upper tube bushing 11 and the lower tube bushing 10 are in contact, the lower tube bushing 10 stops the upper tube bushing 11, and the upper tube 8 cannot continue to move upward, and then the distance between the upper bag support 6 and the lower bag supports 7 reaches the maximum.

Embodiment 2: This embodiment is the same as Embodiment 1 except that in this embodiment, the lower tube 9 is further provided with a strap or fastener structure 19 for fixing a golf bag. In the case where the bottom of the golf bag is placed on and supported by the lower bag support 7, the upper part of the golf bag is placed on the upper bag support 6, the middle or lower part of the golf bag is located at the position of the strap or fastener structure 19, and the golf bag is fixed by means of fasteners or straps provided on the upper bag support 6, the golf bag is further fixed by means of the strap or fastener structure 19.

In the golf bag trolley with an extendable frame, the front wheel set 1 and the lower bag support 7 may be connected in a rotatable manner; the left rear wheel set 2 and the right rear wheel set 3 may also be connected with the connecting base 5 in a rotatable manner; the handlebar set 4 and the upper tube 8 may also be connected in a rotatable manner. When the golf bag trolley is stored or carried out, the connecting base 5 can be rotated so that the frame is in a vertical direction, and the front wheel set 1 is rotated backward to a position between the left rear wheel set 2 and the right rear wheel set 3, and then the handlebar set 4 is rotated to fold the handlebar set 4 and the upper tube 8 together. In this way, the overall size of the trolley is reduced, which facilitates the storage and carrying of the trolley.

What is claimed is:

1. A golf bag trolley with an extendable frame, comprising:

a front wheel set, a left rear wheel set, a right rear wheel set, a handlebar set, a frame, a connecting base, an upper bag support and a lower bag support, the front wheel set is installed at a front end of the lower bag support, the left rear wheel set is installed on the connecting base and is located on a left side of the connecting base, the right rear wheel set is installed on the connecting base and is located on a right side of the connecting base, wherein the frame comprises an upper tube and a lower tube, the upper tube has a smaller outer diameter than the lower tube, a lower part of the upper tube is inserted into the lower tube, the lower bag support is installed at a lower end of the lower tube, the handlebar set is installed at an upper end of the upper tube, the upper bag support is installed on the upper tube, and a locking mechanism is arranged between the lower tube and the upper tube, when the locking mechanism works for locking, the lower tube and the upper tube are relatively fixed, when the locking mechanism is removed, the upper tube is movable in the lower tube and can be locked again, wherein the locking mechanism comprises a lower tube bushing, an upper tube bushing, a pressing block, a buckle, and a connecting pin, wherein the lower tube bushing is coaxially fixed to an inner side of an upper part of the lower tube, the upper tube bushing is fixedly sleeved outside the lower part of the upper tube, and the lower tube bushing is located at a front side of the upper tube bushing, wherein an outer diameter of the upper tube bushing is larger than an inner diameter of the lower tube bushing, a first mounting groove is formed in the connecting base, and the upper part of the lower tube is provided with a second mounting groove facing the first mounting groove, wherein the pressing block is embedded in the first mounting groove and the second mounting groove, the upper tube is exposed at the first mounting groove and the second mounting groove, and left and right sides of the first mounting groove are respectively provided with a mounting plate fixed to the connecting base, wherein an upper part of the buckle is located between the two mounting plates and is provided with an eccentric hole, the connecting pin passes through the two mounting plates and the eccentric hole, and then the buckle is installed on the two mounting plates, wherein the upper part of the buckle is capable of tightly pressing the pressing block against the upper tube and is also separable from the pressing block, and then the pressing block no longer presses the upper tube.

2. The golf bag trolley with the extendable frame according to claim 1, wherein the lower tube is further provided with a strap or fastener structure for fixing a golf bag.

* * * * *